United States Patent [19]

Burger

[11] 4,426,355
[45] Jan. 17, 1984

[54] SPACER GRID FOR NUCLEAR FUEL ASSEMBLY

[75] Inventor: Joseph M. Burger, Granby, Conn.

[73] Assignee: Combustion Engineering, Inc., Windsor, Conn.

[21] Appl. No.: 336,652

[22] Filed: Jan. 4, 1982

[51] Int. Cl.³ .............................................. G21C 3/34
[52] U.S. Cl. ..................... 376/442; 376/438
[58] Field of Search ............. 376/438, 462, 448, 441, 376/442, 439

[56] References Cited

U.S. PATENT DOCUMENTS

| | | | |
|---|---|---|---|
| 3,163,585 | 12/1964 | Metcalfe et al. | 376/438 X |
| 3,365,369 | 1/1968 | Greenhalgh et al. | 376/462 X |
| 3,423,287 | 1/1969 | Anthony et al. | 376/442 |
| 3,764,470 | 10/1973 | Calvin | 376/442 X |

FOREIGN PATENT DOCUMENTS 2060981 5/1981 United Kingdom ............... 376/462

*Primary Examiner*—Richard E. Schafer
*Assistant Examiner*—Daniel Wasil
*Attorney, Agent, or Firm*—L. James Ristas

[57] ABSTRACT

A nuclear fuel assembly grid (12) having four substantially solid perimeter plates (28) forming a rigid quadrangle (20) surrounding the fuel elements (36) and having stop surfaces (32) formed on the internal surfaces thereof for contacting each adjacent fuel element. A plurality of interlaced strips (24) are attached to and extend from each plate to the oppositely facing plate, forming a lattice of regularly spaced openings (16) through which the fuel elements traverse the grid. These strips are of two types, the first consisting of two perpendicular center strips (44,44') that divide the grid into four symmetric quadrants, each center strip having a spring tab (48') projecting into each opening (16') contiguous to the center strip. The second type of interlaced strip consists of the remainder of the strips (52), half of which are oriented parallel to one center strip and the other half are oriented parallel to other center strip. The second type, or interior, strips have a generally undulating bent stop surface (50) such that one bend (56) projects into each adjacent contiguous opening on the side of the interior strip facing the respective parallel center strip. Each interior strip also has a spring tab (48") projecting into each adjacent contiguous opening on the side of the interior strip opposite the respective parallel center strip.

9 Claims, 9 Drawing Figures

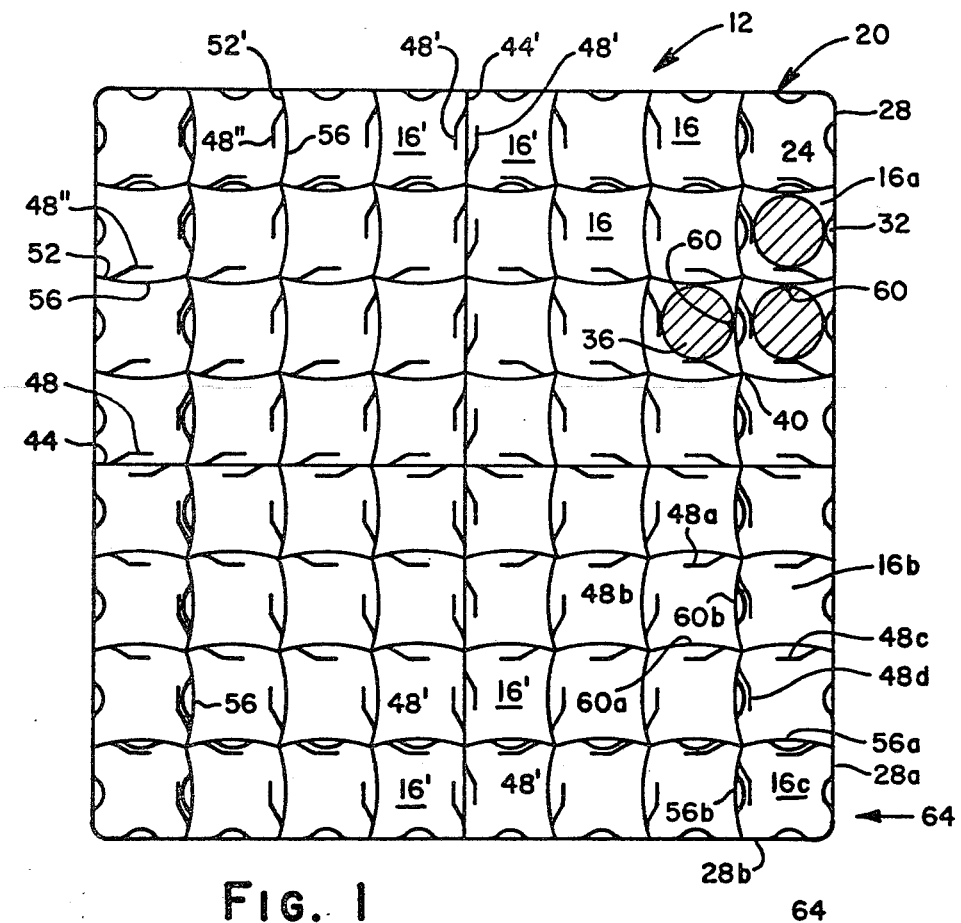
FIG. 1
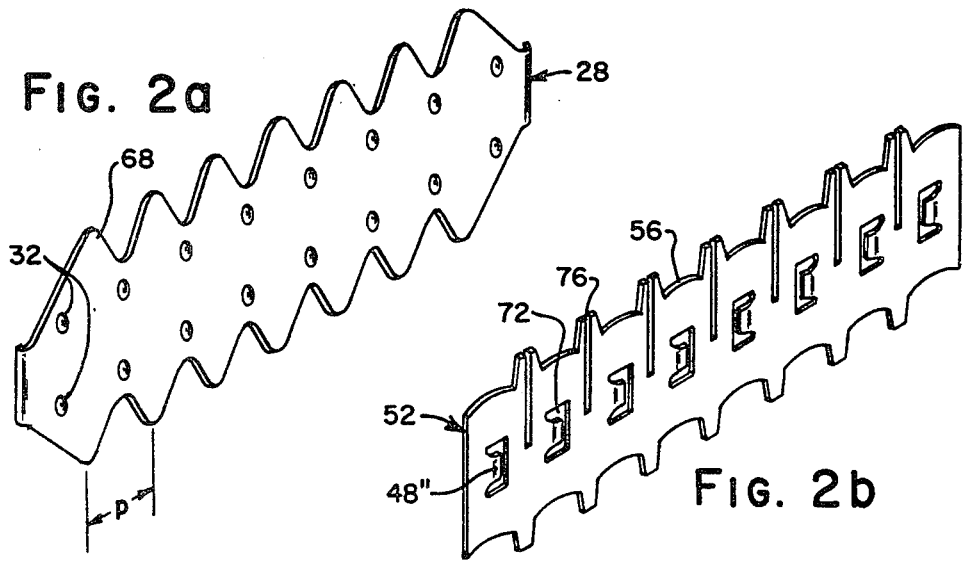
FIG. 2a
FIG. 2b

SPACER GRID FOR NUCLEAR FUEL ASSEMBLY

BACKGROUND OF THE INVENTION

This invention relates to nuclear power reactors, and in particular to structure carried by nuclear fuel assemblies for supporting fuel elements.

It has been the practice for some time to support fuel elements for light water power reactors in fuel assemblies having grids which resiliently urge each fuel rod against a stop surface, thereby providing lateral spacing of the elements while permitting differential thermal expansion of each element in the assembly. A particularly efficient grid of this type is disclosed in U.S. Pat. No. 3,423,287, "Nuclear Reactor Fuel Element Support", wherein the grid strips are bent in alternating directions at intervals corresponding to the fuel element pitch, to form an undulating configuration with the bends serving as relatively rigid stop surfaces. The resilient means are provided by spring tabs integrally formed and projecting from the strips and the perimeter plates that surround the fuel assembly. Relative to other designs, the undulating design is easy to manufacture, since the resilient means and stop surfaces are integrally formed on each strip. Furthermore, the grid is relatively rigid against transverse loads, and presents a relatively small cross-sectional area for minimizing the fuel fluid pressure drop across the grid. Typically, this prior art grid is made entirely of Zircaloy, which is relatively transparent to thermal neutrons.

Recent observations of such all-Zircaloy assemblies removed from the reactor core during refueling, have revealed a persistent tendency for the outer surfaces of the grids to wear. This is due to relative motion and rubbing contact between adjacent spacer grids or core shroud structures, and can be further aggravated by the observed tendency of fuel assemblies to bow or deform, out of their nominally square envelope. It is believed that bowing results from continual asymmetrical lateral flow forces on the assemblies, which in the presence of high radiation, permanently deform the Zircaloy structure. A second observation of the behavior of the prior art grid is its tendency in crush tests, to deform in a predictable fashion to one side or the other.

SUMMARY OF THE INVENTION

It is an object of the present invention to provide a fuel assembly grid that retains the numerous advantages of the aforementioned prior art grid having the undulating strips with integral spring tabs and stop surfaces, but as a greater resistance to wear from rubbing contact and to crushing loads such as may occur during a seismic event.

The invention provides a grid having four substantially solid perimeter plates forming a rigid quadrangle surrounding the fuel elements and having stop surfaces formed on the internal surfaces thereof for contacting each adjacent fuel element. A plurality of interlaced strips are attached to and extend from each plate to the oppositely facing plate, forming a lattice of regularly spaced openings through which the fuel elements traverse the grid. These strips are of two types, the first consisting of two perpendicular center strips that divide the grid into four symmetric quadrants, each center strip having a spring tab projecting into each opening contiguous to the center strip. The second type of interlaced strip consists of the remainder of the strips, half of which are oriented parallel to one center strip and the other half are oriented parallel to other center strip. The second type, or interior, strips have a generally undulating bent stop surface such that one bend projects into each adjacent contiguous opening on the side of the interior strip facing the respective parallel center strip. Each interior strip also has a spring tab projecting into each adjacent contiguous opening on the side of the interior strip opposite the respective parallel center strip. Every fuel element is resiliently supported within the grid, by two spring tabs and two stop surfaces.

The improved performance of the inventive grid is obtained by two changes relative to previous designs. First, the grid perimeter plate surrounding the fuel array does not have large penetrations or "windows". Instead, the invention eliminates the spring tabs from the perimeter plates, and provides only dimples or similar minor deformations to act as stop surfaces for the adjacent fuel rods. The absence of "windows" provides the maximum possible surface area to resist wear. The unperforated perimeter plate is also more resistant to bending and buckling, since it contains more material and therefore increases the grid's resistance to crushing loads.

Second, each of the interlaced, interior grid strips is undulated in a single direction rather than in alternating directions. The arrangement of the undulating interior grid strips in any row is such that the undulations are divided into an equal number of "left handed" and "right handed" undulations, rather than all right or all left handed. As will be explained more fully below, this improvement eliminates the inherent tendency of the prior art assemblies to deform in a predictable direction. Increased crushed strength also improves resistance to seismic loads, and enables use of the invention in power plants located in areas of relatively high seismic activity.

BRIEF DESCRIPTION OF THE DRAWINGS

The preferred embodiment of the invention will be described below in the context of the best mode for carrying out the invention, with reference to the accompanying drawings in which:

FIG. 1 is a schematic plan view of a nuclear fuel assembly grid according to the invention;

DESCRIPTION OF THE PREFERRED EMBODIMENT

Figure 2C:
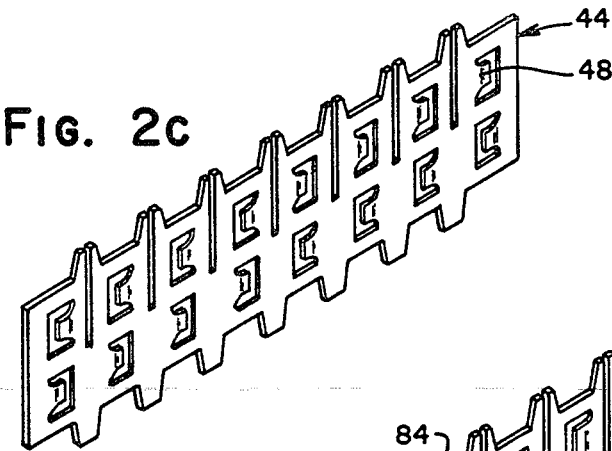
FIGS. 2a,b, and c, are schematic views of the component parts of the inventive grid shown in FIG. 1, illustrating the perimeter plate, interior strip, and center strip, respectively.

FIG. 1 shows the improved fuel assembly grid 12 in somewhat simplified embodiment having an 8×8 regular array of fuel element openings 16 defined by a rigid quadrangular outer strap or belt 20 and a plurality of interlaced strips 24. The belt typically consists of four perimeter plates 28 welded together at the corners. Each perimeter plate includes one, and preferably tow, integral deformations or dimples 32 projecting internally into each adjacent fuel element opening 16a to provide a stop surface for contacting the fuel element 36 (only some are shown). The perimeter plate 28 is substantially solid, with no windows or perforations that would weaken the plate, especially in the corners of the quadrangle 20.

Each interlaced strip 24 is attached, as by welding, to the inside of opposite perimeter plates 28, and is typically notched or slit at regular intervals to intersect with the perpendicularly oriented strips, such as at 40. Typically, the intersections 40 are also welded to maintain the rigidity of the grid. For simplicity, the grid illustrated in FIG. 1 does not include certain conventional structures such as the controd rod guide tubes, which will be described in connection with FIG. 6. For the purpose of describing the invention, the interlaced strips 24 are of two types.

The first type of interlaced strip 24 consists of two perpendicular center strips 44,44' that divide the grid into four symmetric quadrants. Each quadrant has a directional "sense" to be described below, and the center strips 44 provide a neutral boundary between the senses of adjacent quadrants. Accordingly, the center strips are preferably relatively straight as compared with the interior strips 52. Each center strip 44 has a cantilevered spring or spring tab 48 projecting into each opening contiguous to the center strip. For example, center strip 44' has sixteen contiguous openings 16' and sixteen respective spring tabs 48' projecting therein.

The second type of interlaced strip 24 consists of a plurality of interior strips 52,52', half of which are parallel to one center strip 44, and the other half of which are parallel to the other center strip 44'. Each interior strip has a series of undulations 56 which form bent stop surfaces 60 along the same side of the strip. Such bent surface, which provides line contact with a fuel element 36, projects into each adjacent contiguous opening on the side of the interior strip facing the respective parallel center strip. Spring tabs 48" project from the other side of each interior strip, into each contiguous opening.

The grid as described provides two spring tabs 48a,48b and at least two surfaces 60a,60b in every opening, to resiliently support each fuel element that traverses the grid. Since no spring means are provided on the perimeter plates, the two spring tabs 48c,48d in each peripheral opening 16b are found on the interlaced strips. In each grid corner, the opening 16c is defined on two sides by perpendicular perimeter plates 28a,28b, and on the other two sides by undulations 56a,56b that protrude outwardly from the center of the corner opening.

This corner configuration is symmetric with respect to crushing forces applied in either direction as represented by the arrows 64. Thus, there is no "sense" in the corners, although each quadrant has a sense. For example, all the undulations 56 in the lower left quadrant point upward or to the right, whereas all the undulations in the lower right quadrant point upward or to the left.

FIGS. 2a,b, and c show schematically the details of the grid component referred to in FIG. 1. In FIG. 2a, the perimeter plate 28 is substantially solid Zircaloy with pairs of vertically spaced dimples 32 formed at intervals corresponding to the fuel element pitch, p, or center-to-center distance between openings. The substantially solid perimeter plate eliminates the spring tabs found in the prior art design, and avoids the problem whereby the tab foundation can be weakened by the wear between adjacent, oppositely disposed grid perimeter plates. Weakened tab foundations can lead to loss of spring contact with the associated fuel element, or fretting contact which could eventually perforate the fuel element clad. Since the fuel elements 36 contact the inventive grid perimeter plate only at the rugged dimples 32, even significant wear between the adjacent perimeter plates 28 will not degrade the fuel element support provided by the dimples 32. The saw-tooth or serrated upper and lower edges 68 are conventional.

In FIG. 2b, the Zircaloy interior strip 52 has spring tabs 48" preferably formed by a punch press, which also removes some of the material surrounding the tab 48 to provide an open area 72 for cross flow through the strip. The slits 76 are shown at regular intervals between spring tabs. With the 8×8 grid shown, a given interior strip 52 has half (four) of the spring tabs 48" oriented from left to right, four oriented from right to left, and eight undulations 56 formed in a uniform direction. In a conventionally sized 16×16 grid, each strip 52 would have sixteen undulations 56 and associated spring tabs 48". p In FIG. 2c, the center strip 44 has similarly formed spring tabs 48 in pairs, one above the other, projecting out of opposite sides of the strip. As with the interior strips 52, the spring tab pairs on one half of the center strip 44 are oriented in reverse relation to the pairs on the other half of the center strip.

Figure 3:
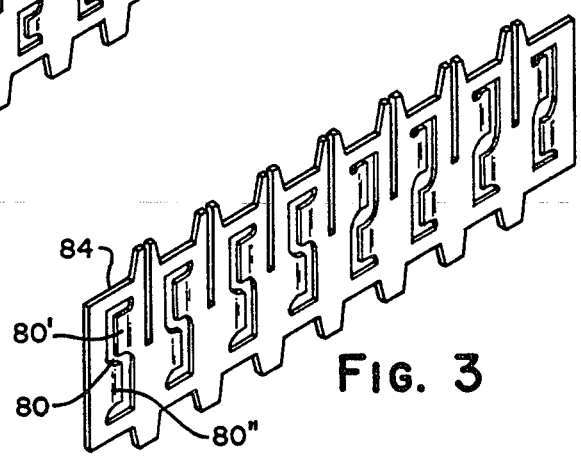
FIG. 3 is a schematic view of an alternative center strip.

FIG. 3 shows an alternative center strip 84 where the pair of spring tabs 80 is formed from a single punch operation, such that a generally S-shaped piece of material is removed and the resulting upper and lower tabs 80', 80", respectively, are bent in opposite directions projecting from the sides of the strip.

Figure 4:
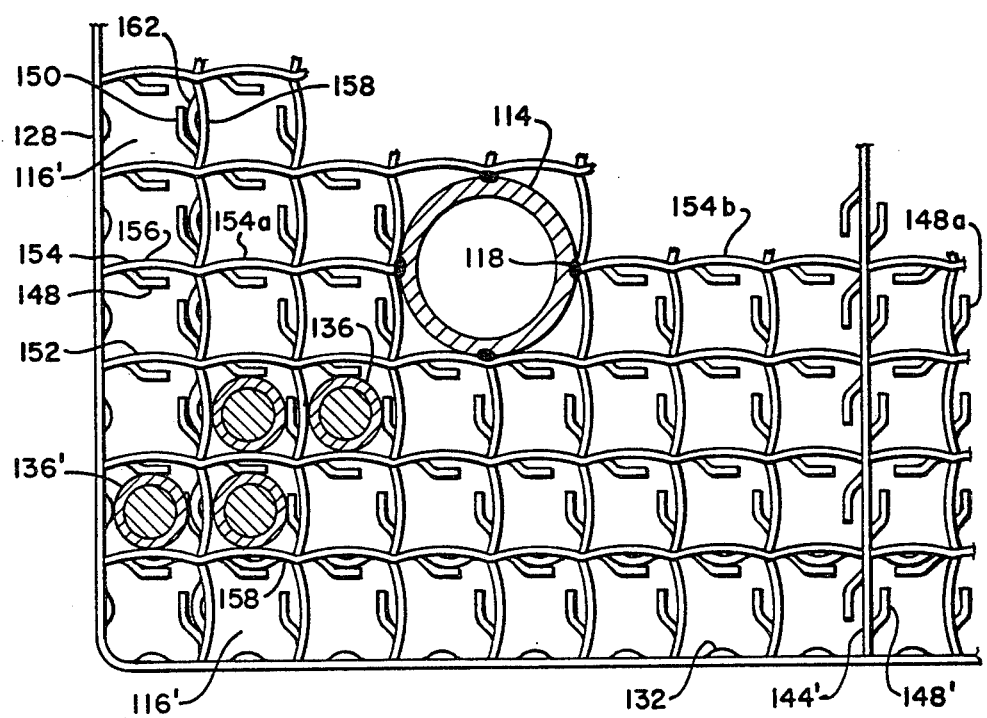
FIG. 4 is a schematic view of a portion of a grid in the preferred embodiment of the invention, having guide tubes in selected fuel openings and including a modified interior strip adjacent to the perimeter plate.

FIG. 4 shows a portion of the preferred grid embodiment wherein a 16×16 array of fuel elements is supported. Such a grid typically has one or more guide tubes 114 in each grid quadrant, displacing one or, as shown, four fuel elements 136. The interior strips 152 are adapted accordingly, by substituting a segmented interior strip 154 having three sections, for the previously described single strip. For example, in a grid having one guide tube 114 symmetrically located in each quadrant, interior strip 154, which runs from left to right, would have three undulations in the first segment 154a, six in the second segment 154b, and three in the last segment (not shown). At the locations where portions of the strip 154 have been omitted, the ends of the segments 154a,154b are welded to the guide tube 114, as at 118. Since each segment is in precise serial alignment, and has all undulations 156 and spring tabs 148 oriented as in strip 152, such segmented strips 154 are considered, for purposes of the claimed invention, to extend between opposite perimeter plates 128.

The other structures in FIG. 4 such as center strip 144', dimples 132, tabs 148' and 148a are similar to corresponding structures 44',32,48' and 48a described in connection with FIGS. 1 and 2. Note that the outer most interior strips 158, which are contiguous to the peripheral openings 116', are modified by the provision of backup arches 162 to the spring tabs 150. The arches 162 have a shorter projection than the spring tabs 150, and serve to limit the travel of a fuel element 136' that might be thrust inward by severe impact load imposed against the exterior of the perimeter plate 128. This backup structure prevents overloading the spring tab beyond its elastic limit, and is conventional.

Figure 5:
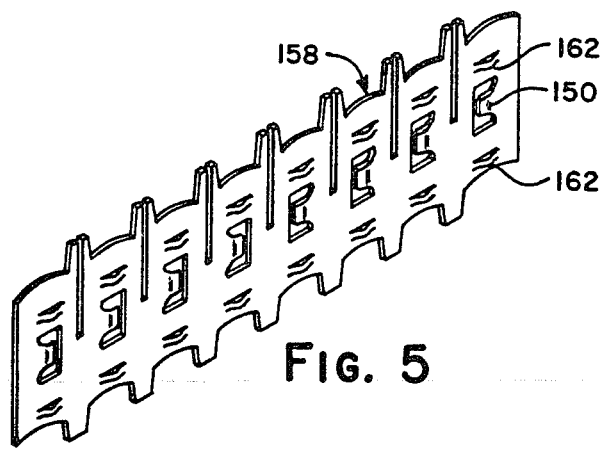
FIG. 5 is a schematic view of one form of modified interior strip, having back-up arches behind the spring tabs.

FIG. 5 illustrates the relationship between the spring tab 150 and the backup arches 162 on the modified interior strip 158.

Figure 6:
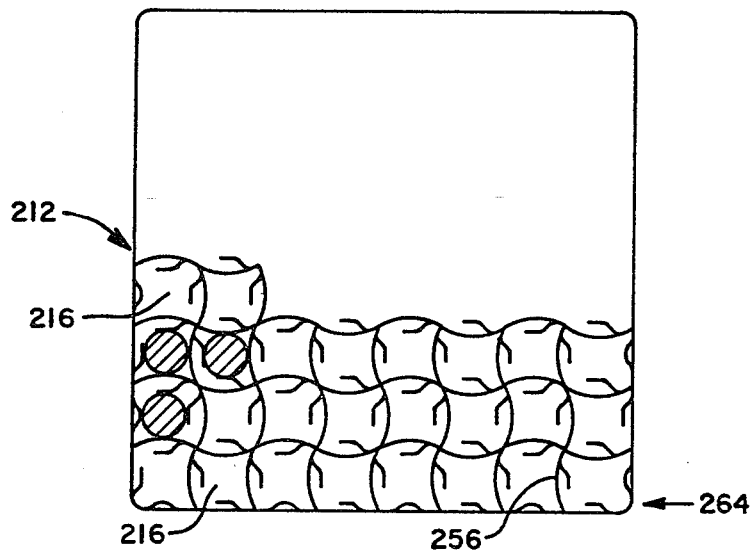
FIG. 6 is a schematic view of a nuclear fuel assembly grid of the type described in the prior art as represented by U.S. Pat. No. 3,423,287.
Figure 7:
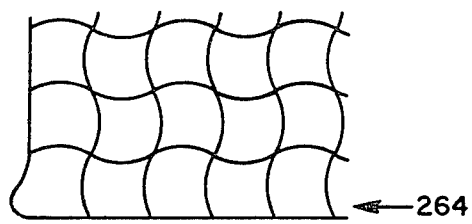
FIG. 7 is a schematic representation of the corner bulging observed in prior art fuel assemblies under a crushing load.

The crushed strength advantage of the present invention may be appreciated in view of a brief comparison with the conventional grid, shown in FIG. 6. In the conventional grid 212, each peripheral row of openings 216 has a "sense". In FIG. 6 the bottom row has vertically oriented strip undulations 256 pointing toward the left, i.e. a left-handed sense. A lateral load, whether due to seismic or bowing forces operating along arrow 264 has been found to consistently produce a corner deformation as illustrated in FIG. 7. This is believed due to the left-handed sense of the grid and the resulting predisposition to deform according to such sense. Another factor in the behavior of the prior art grid could be the way in which the interior strips are attached to the perimeter plate. For example, they do not butt flush with the plate, but contact it at an angle. The welding operation may then bias the strip one way or the other. The present invention negates these effects by introducing overall symmetry to the grid so that internal forces and moments are balanced in any row and furthermore, manufacting tolerances or other biases are equalized.

In the preferred embodiment of the invention as described above, the perimeter plate 128 is substantially solid and the interior of the grid is divided into symmetrical quadrants. In situations where maximum crush strength is not required, such as in areas of low seismic activity, the invention may be adapted to employ anti-bowing springs such as those described in co-pending application U.S. Ser. No. 325,712 "Anti-Bow Grid For Nuclear Fuel Assembly", filed Nov. 30, 1981. There is disclosed therein an improved grid having a plurality of externally projecting, integrally formed anti-bowing springs spaced about the grid perimeter plate, for interacting with flat surfaces on the opposite grid of an adjacent assembly. The anti-bowing springs are horizontally separated along each grid in periodic alternation with substantially flat portions of the perimeter plate. The flat portions are along the edges of the "windows" formed at the time the spring tabs are punched through the perimeter plate. With the present invention, the windows and spring tabs are eliminated, thereby providing larger, flat surfaces for contact by the oppositely disposed bowing springs. Thus, the anti-bowing springs will not rub against edges of windows, but rather on smooth flat surfaces. Although in such embodiment the perimeter plate would not have windows or spring tabs for supporting fuel elements, the preferred form of the anti-bowing springs could include narrow, vertically oriented slits at spaced intervals along the perimeter plate. The scope of the present invention includes grids having the interior and center strip arrangement as previously described, but with perimeter plates which, by inclusion of such slits, are substantially solid rather than totally solid.

I claim:

1. A fuel assembly grid for supporting a rectangular array of nuclear fuel elements intermediate their ends, comprising:

four substantially solid perimeter plates forming a rigid quadrangle surrounding the fuel elements and having stop surfaces formed on the internal surfaces thereof for contacting each adjacent fuel element;

a plurality of interlaced strips attached to and extending from each plate to the oppositely facing plate, forming a lattice of regularly spaced openings through which the fuel elements traverse the grid, said strips being of two types;

the first type of said interlace strips consisting of two perpendicular center strips that divide the grid into four symmetric quadrants, each center strip having a spring tab projecting into each opening contiguous to the center strip;

the second type of said interlaced strips consisting of a plurality of interior strips, half of said interior strips oriented parallelly to one center strip and the other half oriented parallelly to the other center strip, each interior strip having a generally undulating bent stop surface such that one bend projects into each adjacent contiguous opening on the side of the interior strip facing the respective parallel center strip, and wherein each interior strip has a spring tab projecting into each adjacent contiguous opening on the side of the interior strip opposite the respective parallel center strip;

whereby every fuel element is resiliently supported within the grid, by two spring tabs and at least two stop surfaces.

2. The fuel assembly of claim 1 wherein each center strip is flat.

3. The fuel assembly of claim 2 wherein the stop surfaces on the perimeter plate are pairs of vertically spaced dimples.

4. The fuel assembly of claim 2 wherein the center strip has similarly formed spring tabs in pairs, one above the other, projecting out of opposite sides of the center strip.

5. The fuel assembly of claim 2 wherein the spring tabs on one half of the interior strip are oriented from left to right and the spring tabs on the other half of the interior strip are oriented from right to left.

6. The fuel assembly of claim 2 wherein the spring tabs on one half of each center strip are oriented from left to right and the spring tabs on the other half on the center strip are oriented from right to left.

7. The fuel assembly of claim 1 wherein the perimeter plates are totally solid.

8. The fuel assembly of claim 7 wherein each center strip is flat.

9. The fuel assembly grid of claim 8 wherein the stop surfaces on the perimeter plates are pairs of vertically spaced dimples.

* * * * *

UNITED STATES PATENT AND TRADEMARK OFFICE
CERTIFICATE OF CORRECTION

PATENT NO. : 4,426,355
DATED : January 17, 1984
INVENTOR(S) : Joseph M. Burger

It is certified that error appears in the above—identified patent and that said Letters Patent is hereby corrected as shown below:

Column 3, line 10 change "tow" to --two--
          line 53 after "two" insert --stop--

Column 4, line 4 change "component" to --components--
          line 33 after "48"." delete letter --p--
          line 33 start new paragraph with words "In FIG. 2c"

Signed and Sealed this

Twenty-fifth Day of September 1984

[SEAL]

Attest:

GERALD J. MOSSINGHOFF

Attesting Officer      Commissioner of Patents and Trademarks